April 26, 1932.　　　F. M. HARGRAVE　　　1,855,961
MOBILE MELTING AND DISTRIBUTING APPARATUS
Filed Jan. 30, 1930　　　6 Sheets-Sheet 1
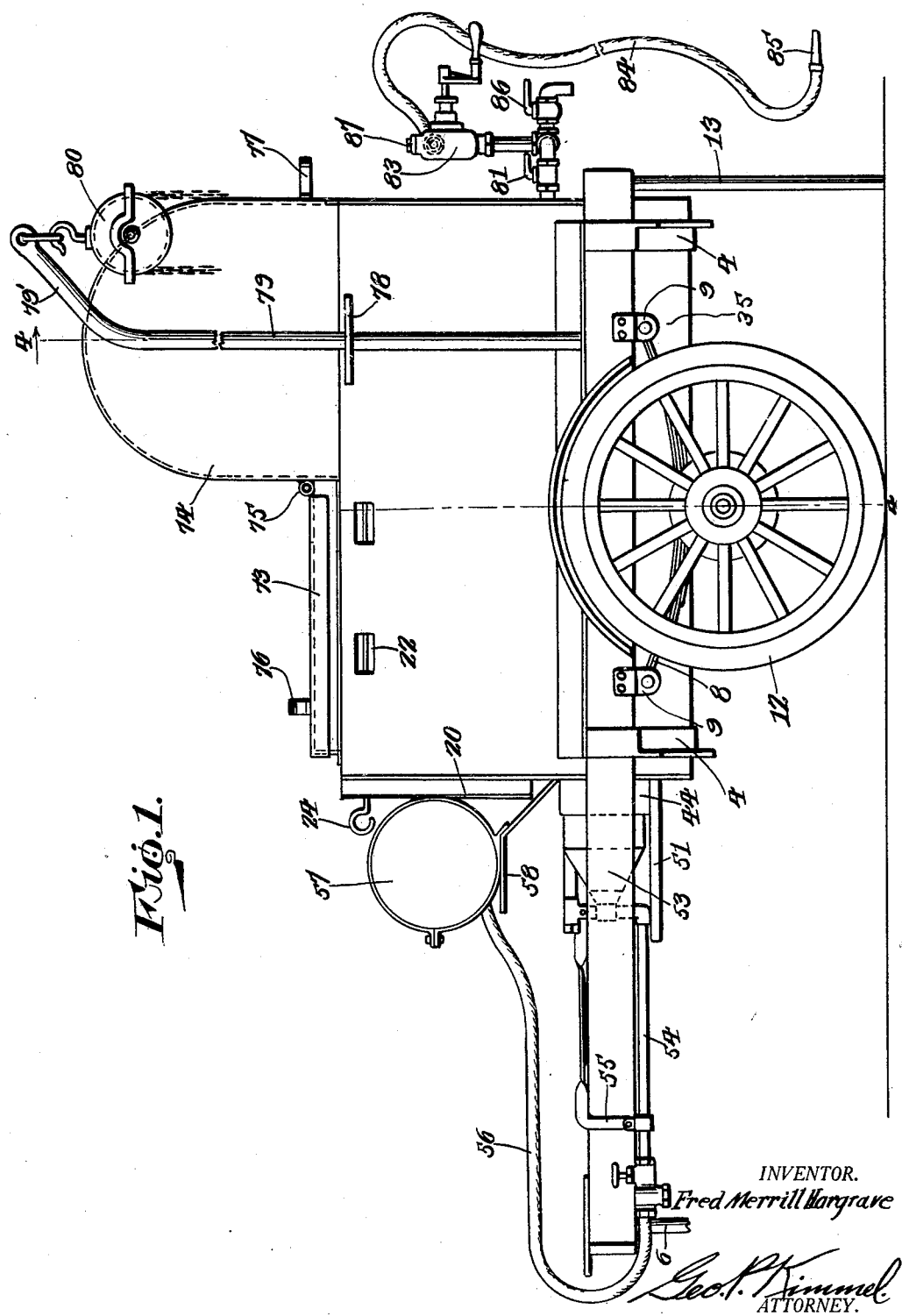

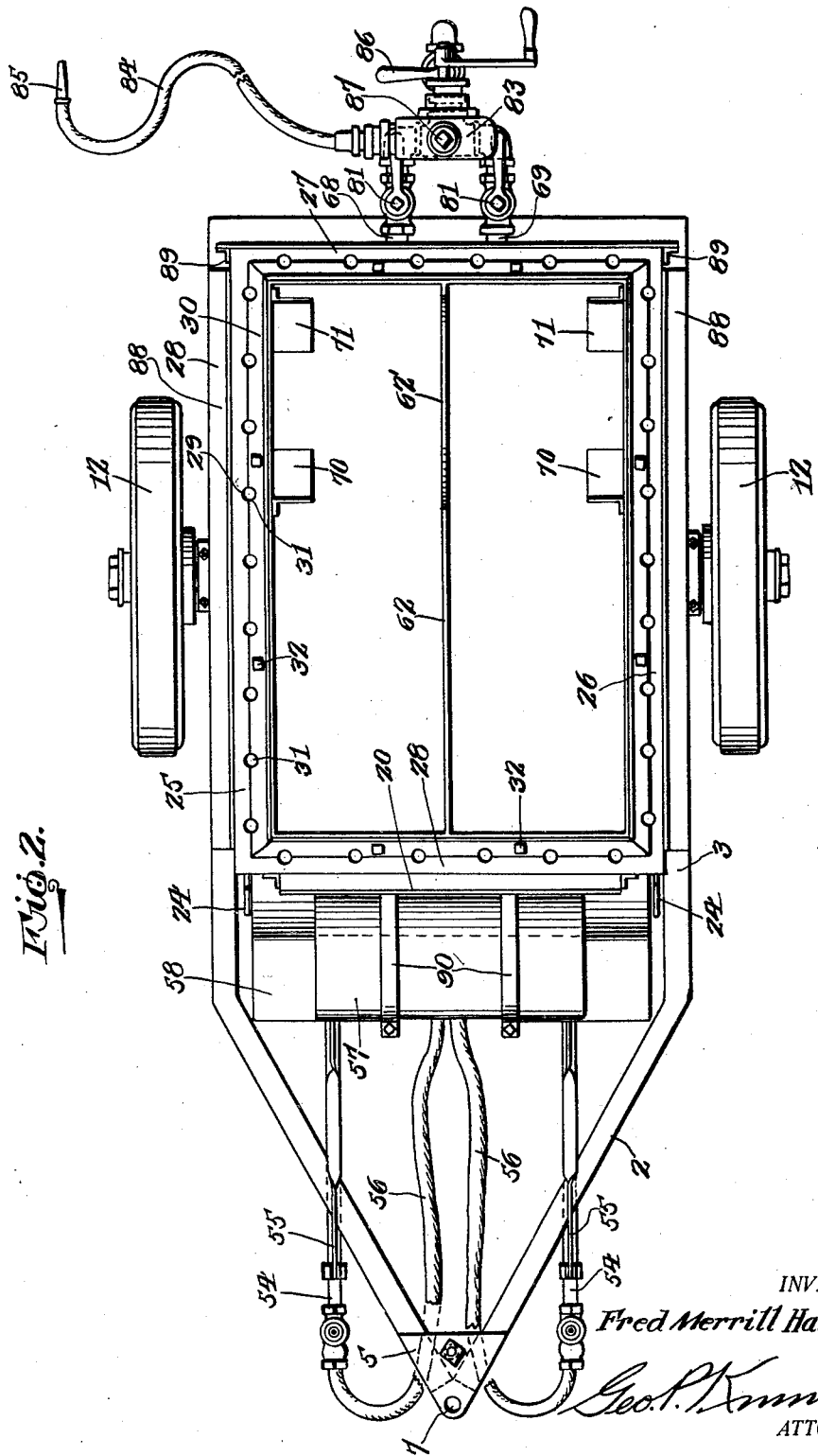

April 26, 1932. F. M. HARGRAVE 1,855,961
MOBILE MELTING AND DISTRIBUTING APPARATUS
Filed Jan. 30, 1930 6 Sheets-Sheet 3
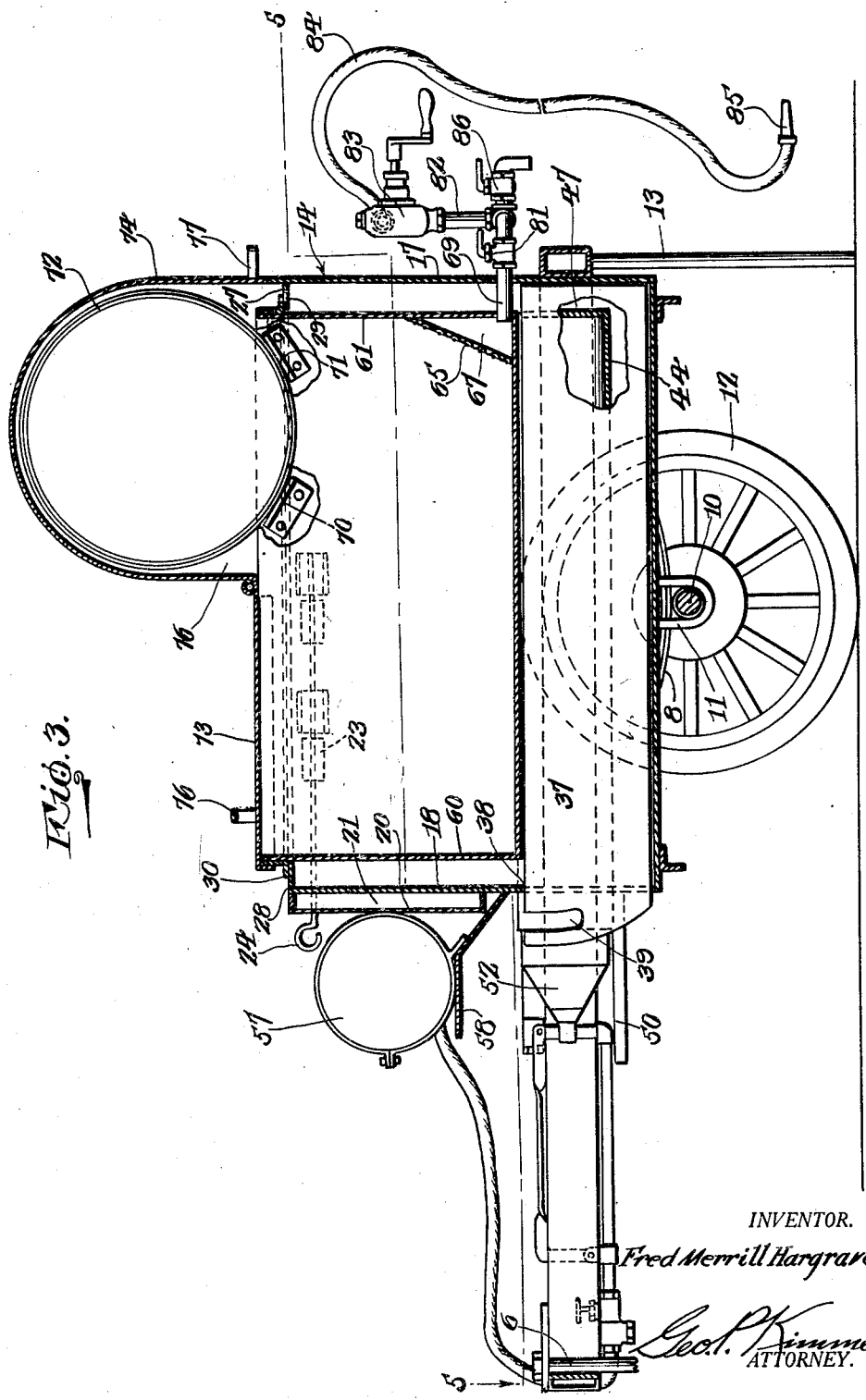
INVENTOR.
Fred Merrill Hargrave,
Geo. P. Kimmel
ATTORNEY.

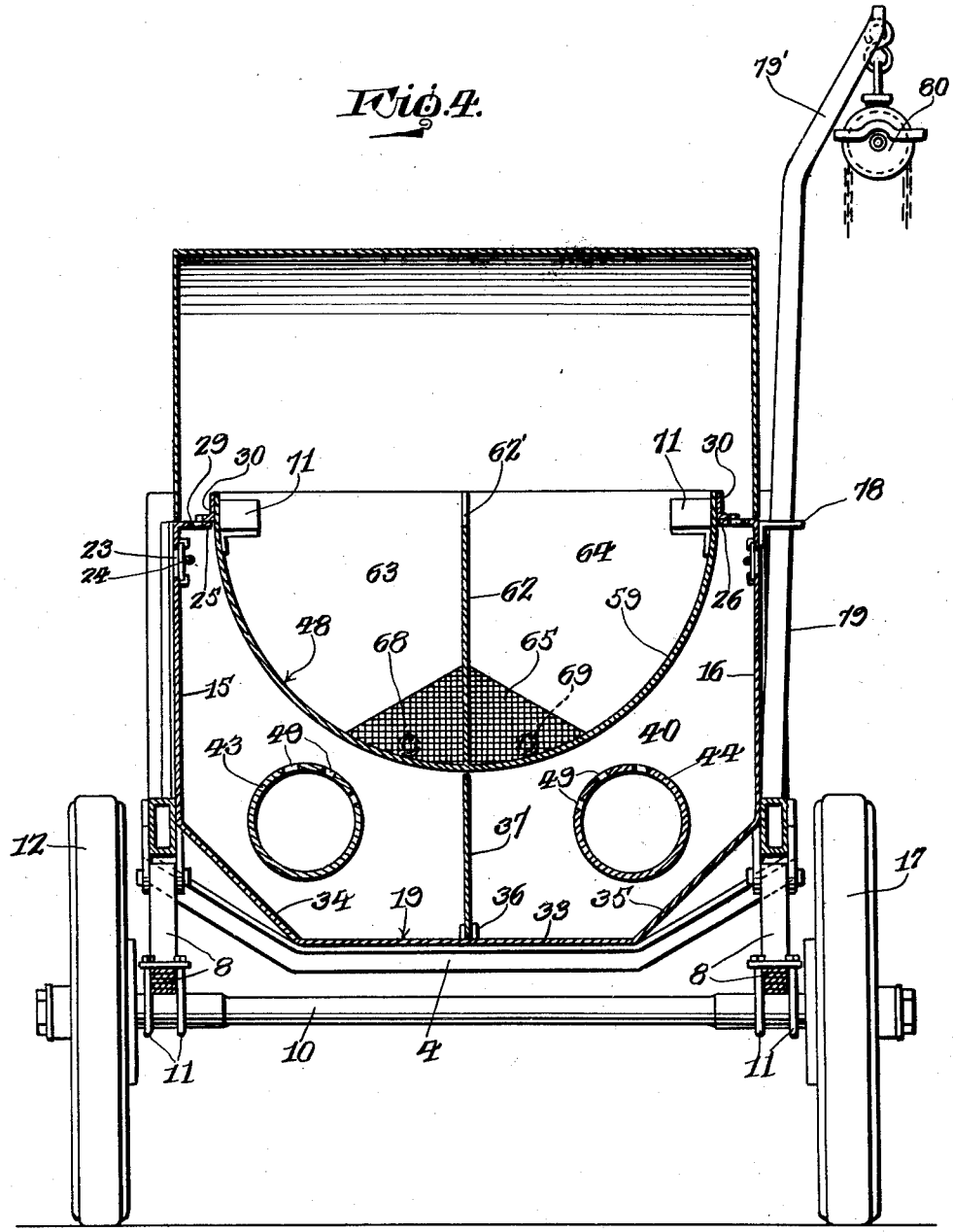

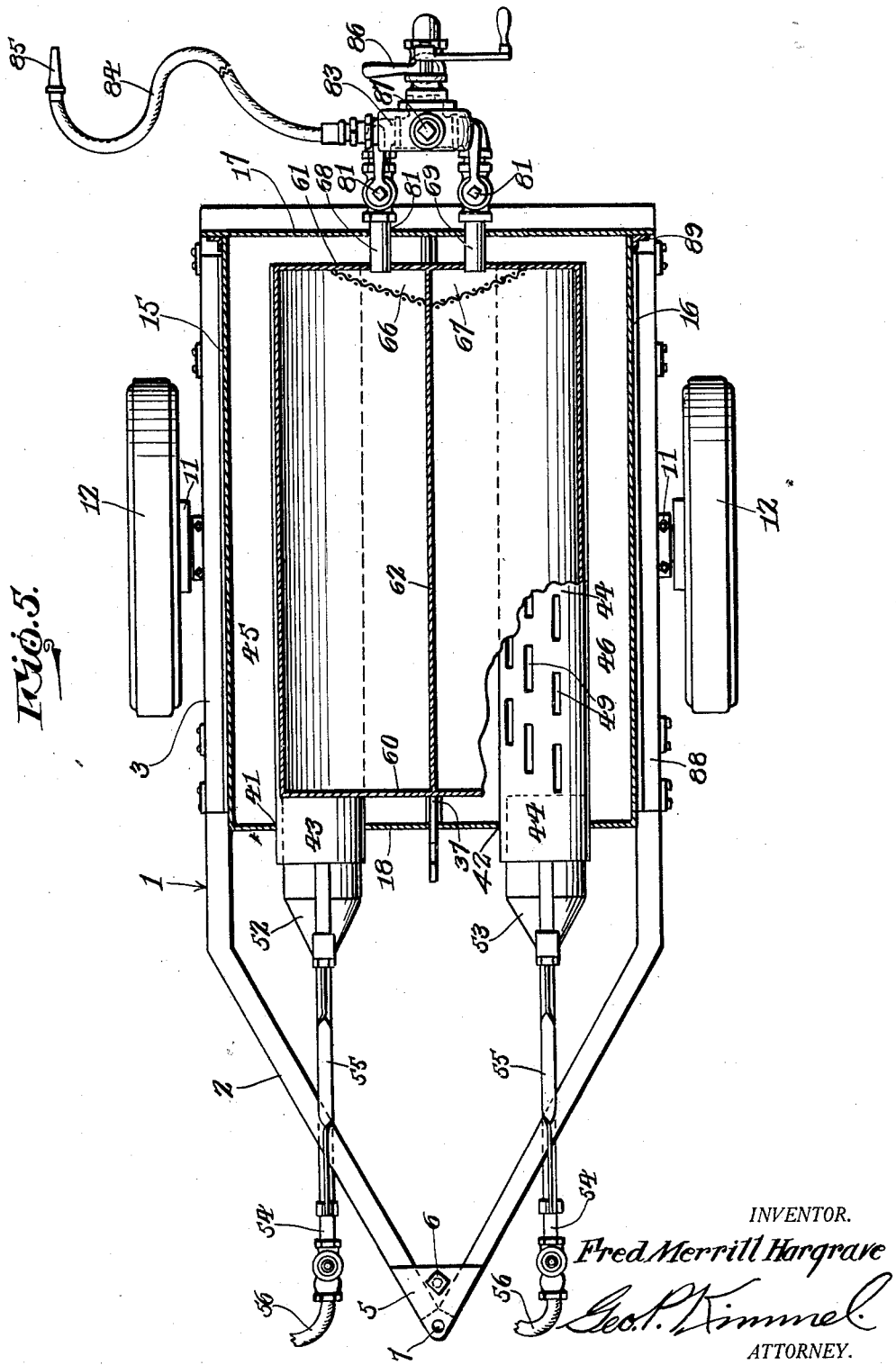

April 26, 1932.   F. M. HARGRAVE   1,855,961
MOBILE MELTING AND DISTRIBUTING APPARATUS
Filed Jan. 30, 1930   6 Sheets-Sheet 6
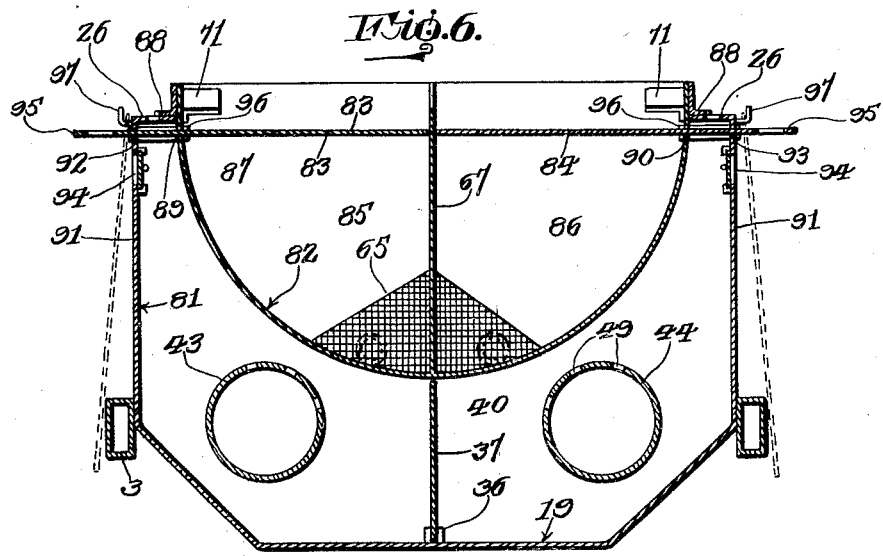
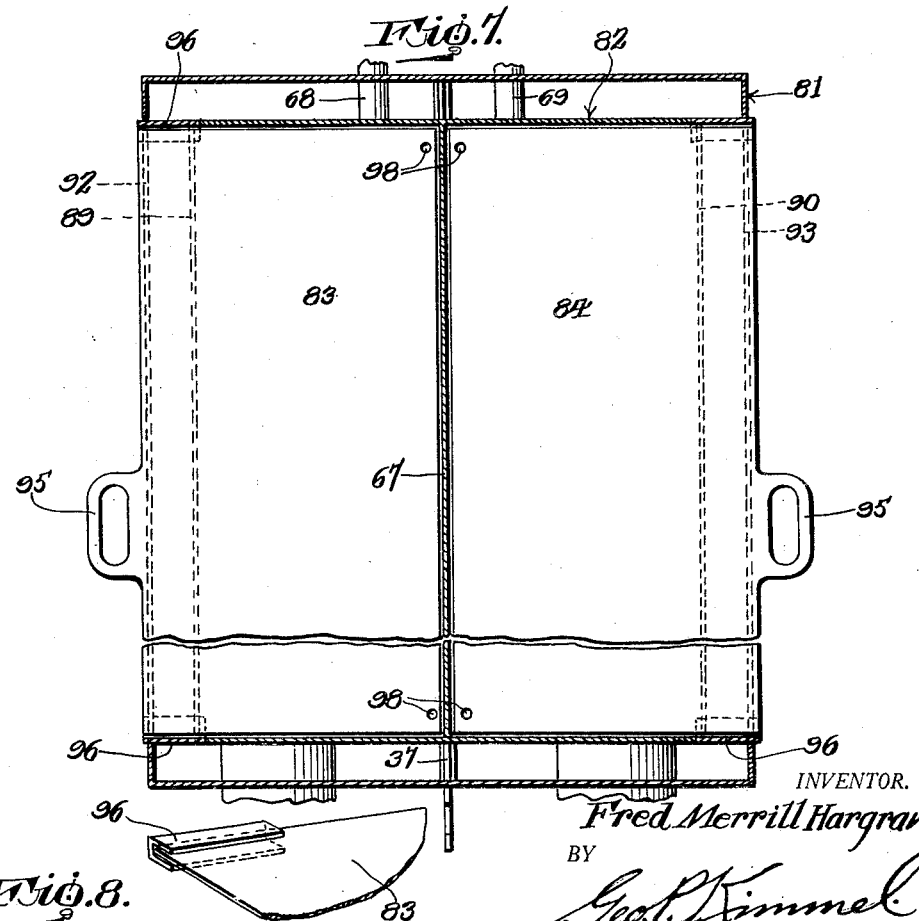
INVENTOR.
Fred Merrill Hargrave
BY
Geo. P. Kimmel
ATTORNEY.

Patented Apr. 26, 1932

1,855,961

UNITED STATES PATENT OFFICE

FRED M. HARGRAVE, OF CEDAR RAPIDS, IOWA

MOBILE MELTING AND DISTRIBUTING APPARATUS

Application filed January 30, 1930. Serial No. 424,713.

This invention relates to a mobile melting and distributing apparatus for bitumen, asphalt or tar and has for its object to provide, in a manner as hereinafter set forth, an apparatus of the type referred to for expeditiously melting bitumen, asphalt or tar, and including means whereby the melted substance can be readily delivered, in the desired manner at the location where the melted substance is to be used.

A further object of the invention is to provide, in a manner as hereinafter set forth, an apparatus for the purpose referred to including means for distributing a melted body of bitumen, asphalt or tar therefrom while another body of bitumen, asphalt or tar is being melted therein.

A further object of the invention is to provide, in a manner as hereinafter set forth, an apparatus for the purpose referred to including a melting tank of the compartment type adapted to contain a substance to be melted, and further including means whereby the compartments of the tank can be heated simultaneously or independently for melting such substance therein.

A further object of the invention is to provide, in a manner as hereinafter set forth, an apparatus for the purpose referred to including a melting tank provided with a plurality of compartments for containing bitumen, asphalt or tar to be melted, and further including means whereby the compartments of the tank can be heated simultaneously or independently for melting the contents therein, and with the apparatus further including means whereby the melted material can be simultaneously withdrawn from the several compartments of the tank or independently withdrawn from each compartment of the tank and delivered, in the desired manner, at the location where the melted material is to be employed.

A further object of the invention is to provide, in a manner as hereinafter set forth, an apparatus for the purpose referred to including a firebox capable of being employed simultaneously for heating a plurality of compartments containing bitumen, asphalt or tar to be melted, or for heating each compartment independently.

A further object of the invention is to provide, in a manner as hereinafter set forth, an apparatus for the purpose referred to including a melting tank formed with a plurality of compartments to enable the melting of different materials simultaneously and further including means whereby the contents of the several compartments can be discharged independently of each other.

A further object of the invention is to provide in a manner as hereinafter set forth, an apparatus for the purpose referred to including a melting tank, an outer shell or casing enclosing the latter and providing a firebox, and burner flues positioned within the firebox and so constructed and arranged to prevent any direct flame from coming in contact with the tank and casing to prevent the burning of the latter, whereby the life of the tank and casing is materially increased than would be the case if the flame from the burners came in direct contact with the tank and casing.

A further object of the invention is to provide, in a manner as hereinafter set forth, an apparatus for the purpose referred to including a pair of burner elements simultaneously or selectively thrown into operation when occasion requires.

A further object of the invention is to provide, in a manner as hereinafter set forth, an apparatus for the purpose referred to including one or more burner elements and a fuel supply therefor and with means to prevent the flames and heat from the burners reaching the supply of fuel.

A further object of the invention is to provide, in a manner as hereinafter set forth, an apparatus for the purpose referred to including a melting tank and an outer shell or casing enclosing such tank and further with the tank detachably connected to the shell to permit of the removal of the tank when occasion requires.

A further object of the invention is to provide, in a manner as hereinafter set forth, an apparatus for the purpose referred to including a main draw-off means for the melted material and with such means so arranged as to be encircled by heat, under such conditions maintaining the material as it passes through such means, hot.

A further object of the invention is to provide, in a manner as hereinafter set forth, an apparatus for the purpose referred to including means to prevent the slipping or tilting of the melting tank when the apparatus is stationary.

A further object of the invention is to provide, in a manner as hereinafter set forth, an apparatus for the purpose referred to including means for conveniently elevating a barrel of bitumen, asphalt or tar to a position within the apparatus so that the contents thereof can be preliminarily heated during the melting of another body or substance within one or both of the compartments of a melting tank and further including means whereby any drip from the barrel will be conducted to the melting tank.

A further object of the invention is to provide, in a manner as hereinafter set forth, an apparatus for the purpose referred to, including a firebox and burner flues extending lengthwise thereof and with the flues so constructed and arranged so that they can be conveniently removed when occasion requires.

Further objects of the invention are to provide, in a manner as hereinafter set forth, a mobile melting and distributing apparatus for bitumen, asphalt or tar which is comparatively simple in its construction and arrangement, strong, durable, compact, thoroughly efficient in its use, readily assembled, having convenient means to provide for the discharge of the melted substance, readily assembled, and comparatively inexpensive to set up.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a side elevation of a mobile melting and distributing apparatus for bitumen, asphalt or tar in accordance with this invention.

Figure 2 is a top plan view thereof with the cover removed.

Figure 3 is a longitudinal sectional view thereof.

Figure 4 is a section on line 4—4, Figure 1.

Figure 5 is a section on line 5—5, Figure 3.

Figure 6 is a cross sectional view of a modified form of outer casing or shell and melting tank or kettle.

Figure 7 is a sectional plan, broken away, of the modified form shown in Figure 6.

Figure 8 is a detail in perspective illustrating the form of guide members for the covers.

The apparatus includes a supporting frame referred to generally at 1 and which is formed of a forwardly directed tapered part 2 and a rectangular rear part 3. The frame 1 preferably is constructed of channel-irons, but it is to be understood that it can be set up from any shape of beams or irons as desired. The frame 1 includes a pair of spaced, combined brace and supporting members 4 of truss-like form depending from and extending transversely with respect to the frame part 3. The members 4 have their ends coupled to the sides of the part 3, and the latter is closed at its rear and open at its forward end where it merges into the part 2. The forward end of the frame part 2 has secured upon the top thereof a triangular shaped reinforcing plate 5 formed with an aperture for the passage of a supporting standard 6. The plate 5 couples the frame members of the part 2 together at the forward ends of such members and is provided with an opening 7 for connecting a traction means to the apparatus when desired.

Arranged in alignment with each side of the frame part 3, as well as being positioned below such side, is an arcuate spring 8 of the laminated type and which has its ends secured with such sides by the coupling devices 9.

The apparatus includes an axle 10 upon which seat the springs 8 and such springs are connected to the axle 10 by the coupling devices 11. The axle 10 is of a length greater than the width of the frame part 3 and carries, adjacent the sides of said frame part 3, wheels 12 of the desired diameter. The axle 10 is arranged in spaced relation with respect to the frame 1 and is disposed in alignment with the transverse median of the frame part 3.

Suitably connected to the rear end of the frame part 3 is a supporting standard 13, which in connection with the standard 6, prevents the apparatus from tilting when the latter is stationary. The standards 6 and 13 are constructed in a manner to prevent the shifting of the apparatus on its wheels when desired.

Positioned between the sides of the frame part 2, mounted upon the members 4 and bearing against the inner face of the rear end of the frame part 3 is an outer casing or shell referred to generally at 14. The casing 14 projects a substantial distance above the frame 1 and has its forward end positioned rearwardly with respect to the forward end of the frame part 3. The casing 14 is secured in any desirable manner to the frame part 3 and to the member 4. The casing 14 includes a pair of side walls 15, 16, a back wall 17, a front wall 18, a bottom 19 which depends below the side walls 15, 16 and an extension portion 20 on the front wall 18 of less height than the height of the latter. The purpose of the extension portion 20 will be presently referred to, but it is constructed in a manner to provide in connection with the front wall 18 a chamber 21.

Each side wall of the casing is provided near the top thereof with a spaced opening 22 controlled by dampers 23 carried by an adjusting rod 24 for the dampers. The walls 15, 16, 17 and 18 of the casing 14 are provided at their tops with inwardly extending, right angularly disposed flanges 25, 26, 27 and 28 respectively. Each of said flanges is formed with a series of spaced openings as indicated at 29. Mounted upon the upper face of each flange is an upstanding angle iron 30 having its horizontal leg formed with spaced, semi-circular notches 31 which register with the walls of the openings 29. The angle irons 30 are detachably secured upon the flanges 25, 26, 27 and 28 by bolts and nuts or other suitable removable holdfast devices as indicated at 32. The angle irons 30 form an integral part of a tank or receptacle for melting bitumen, asphalt or tar, and such tank or receptacle will be hereinafter more specifically referred to.

The bottom 19 of the casing 14 includes a flat intermediate part 33 and a pair of oppositely inclined, upstanding outer parts 34, 35 which merge into the sides 15, 16 of the casing. The rear or back wall 17 of the casing has its lower end conformed to the shape of the bottom 19. This statement also applies to the forward wall 18 of the casing 14. Centrally of the upper face of the part 33 of the bottom 19, a pair of spaced guide members 36 are arranged and which are connected to said part 33. The members 36 provide guides for a removable partition 37 which is of a length greater than the length of casing 14. The front wall 18 of casing 14 is formed at its vertical median with a vertically disposed slot 38 for the passage of the partition 37, the latter having its forward end provided with a handle portion 39 which is permanently arranged forwardly of the wall 18. The casing 14 provides a firebox 40 and the partition 37 coacts with the casing 14 and the melting tank, to be presently referred to, to divide the firebox into two chambers, and which can be simultaneously or selectively employed for heating purposes.

The lower part of the wall 18, adjacent each side wall of the slot 38 is formed with a circular opening of the desired diameter and such openings are indicated at 41, 42. Extending through the openings 41, 42 and into the firebox 40 are flues 43, 44 respectively, the former being positioned in the heating chamber 45 and the latter in the heating chamber 46, said chambers being provided when the partition 37 is disposed lengthwise of the firebox 40. The inner end of each of said flues is closed as indicated at 47. The inner ends of the flues 47 are positioned substantially in alignment with the rear end of the melting tank, the latter to be presently referred to. The flues 43, 44 are positioned a substantial distance below the melting tank and the latter is indicated generally at 48.

Each flue is provided at its top and at the top of the inner side thereof with openings 49 and by the arrangement of such openings 49, the flame is prevented from coming in direct contact with the casing 14. The closing of the inner end of each of the flues prevents the burning out of the rear end of the casing 14.

Projecting forwardly from the wall 18 of the casing 14 and positioned below the outer ends of the flues 43, 44 are supports 50, 51. Extending into the flues 43, 44 are liquid fuel burners 52, 53 respectively. Leading to each burner is a valve controlled feed pipe 54 supported by a bracket 55. Opening into each feed pipe 54 is a flexible line 56 for supplying liquid fuel from a tank 57 which bears against the extension 20 and is supported on a shield 58 which extends forwardly from the wall 18. The extension 20 protects the tank 57 from the heat from the firebox and the shield 58 protects the tank 57 from the flames from the burners.

The tank, receptacle or kettle 48 for containing the material or substance to be melted is of less length than that of the casing 14 and is spaced at its sides, front, rear and bottom from the walls and bottom of casing 14. The tank 48 is removably connected to the flanges at the upper ends of the walls of the casing in a manner as hereinbefore referred to. The angle irons 30 are formed integral with the sides and ends of the body portion 59 of the tank 48. The front of the tank 48 is indicated at 60 and its rear at 61. The body portion 59 is of semi-cylindrical cross section. The angle irons 30 are connected to the tank 48 in a manner whereby the upper portion of the tank 48 will project a substantial distance above the flanges at the tops of the walls of casing 14. The tank 48 at its longitudinal median has secured therein a vertically disposed partition 62 to provide a pair of melting compartments 63, 64.

Secured to the partition 62 and to the inner face of the rear wall 61 of the tank 48, as well as being arranged on each side of the partition 62 and secured to the upper face of the bottom of tank 48, is an inclined filtering means or screen 65 which has its top secured to the inner face of the rear wall 61 and inclines forwardly from such wall, and then has its bottom edge secured to the inner face of tank 48 at the bottom of the latter. The screen 65 in connection with the partition 62, body portion 59 and rear wall 61 provides a pair of compartments 66, 67 for the reception of the filtered product. The compartment 63 communicates with compartment 66. The compartment 64 communicates with the compartment 67. Leading from the compartment 66 is a draw-off pipe 68 and leading from the compartment 67 is a draw-off pipe 69. The pipes 68 and 69 project through the rear wall 17 of the casing 14 and as the rear end of the tank 48 is spaced from the wall 17, the pipes 68 and 69 are enveloped by heat from the firebox or compartments 45, 46, under such conditions the product as it is withdrawn from the compartments 66, 67 will be maintained in a melted condition.

Secured to the inner face of each side of the body portion 49 in proximity to the top of such side, is a pair of spaced supports 70, 71. The pairs of supports act as a means for supporting a container in which is arranged the substance to be melted whereby a preliminary heating is had for such substance, or, the pairs of supports can have seated thereon a barrel of bitumen, asphalt or tar, as indicated at 72, to obtain a preliminary heating before the contents of the barrel is placed into the compartments 63, 64 or either one of such compartments.

The tank 48 is provided with a two-part cover, one indicated at 73 and the other at 74. The parts or sections of the cover are hinged together as at 75. The part 73 is flanged and of rectangular contour and closes the forward part of tank 48, as the section 73 seats thereon. The part or section 74 is of hood-like form and seats upon the rear part of the casing 14 and provides in connection therewith an auxiliary heating chamber 76 for the contents of the barrel 72 or for the contents of the container which is mounted upon the pairs of supports secured to the body portion 59 of the tank 48. The cover section 73 when it is desired to open it, swings toward the cover section 74 and the latter when it is desired to open it, swings toward the cover section 73. The section 73 is provided with a handle member 76 and the section 74 with a handle member 77.

Secured to one of the sides of the frame part 3, in proximity to the rear of the latter, as well as being connected to one side of the casing 14, by a retainer 78, is a vertically disposed post or standard 79, having a rearwardly directed, angularly disposed upper end 79', which carries a block and chain 80 for the purpose of elevating and lowering the barrel 72 to position it upon the pairs of supports, as well as for removing it from such position.

When the cover section 74 is mounted in closed position, the heat can pass through certain of the openings 29 into the auxiliary heating chamber 76. See Figure 4.

The rear wall 17 of the casing 14 is provided with openings 81 for the passage of the pipes 68, 69. The pipe 68, as well as the pipe 69 is provided with a cutoff valve 81 and said pipes open into a common receiver 82 which leads to a manually operated pump 83.

Extending from the pump 83 is a distributing line 84 for the melted product and the latter is provided with any suitable type of nozzle 85 for depositing the melted product at the desired point. The common receiver 82 is formed with a valve controlled outlet 86. The pump 83 is formed with a closable discharge outlet 87 to permit of another distributing line, not shown, being connected with the pump whereby the latter can be employed for discharging the melted product at two different points.

The manner of setting up the firebox 40 permits of the same being used for simultaneously heating the compartments 63, 64 or for heating said compartments selectively. The discharge of the melted product can be had independently from either one of the melting compartments or from both melting compartments simultaneously. When the partition 37 is withdrawn the firebox 40 is common to both compartments, but when the partition 37 is arranged within the firebox the heating chambers 45, 46 are provided, and the former is for heating compartment 63 and the latter for heating compartment 64.

When but one melting compartment is employed, one or both burners may be used. The burners are independent of each other and can be used simultaneously or collectively. By setting up the tank 48 with two compartments two different kinds of material can be melted simultaneously, and the melted product can be independently discharged from either compartment. The structural arrangement provides whereby a melted product can be withdrawn from one compartment during the melting of a product in the other compartment. As the firebox or heating chambers substantially surround the tank 48, the melting step is carried on in an expeditious manner, whether both or but one compartment for the tank 48 is employed.

The partition 62 is cut away as at 62' to provide a clearance and support for the barrel 72 or other container when mounted upon the pairs of supports 70, 71.

The sides of the part 3 have secured thereto upstanding angle irons 88 which are connected to the sides of casing 14. The rear wall 17 of casing 14 projects from the side walls 15, 16. The walls 15, 16 and 17 are secured together by angle irons 89. Holdfast means 90, in the form of straps are employed for fixedly securing tank 57 to shield or protector 58.

The apertures or openings 29 provide outlets for the firebox. When cover section 73 is in closed position the flanges thereof are arranged inwardly of openings 29. When cover section 74 is in closed position, it seats on the walls 15, 16 and 17 of casing 14 outwardly with respect to openings 29. Cover section 73 closes one portion of the open top of tank 48 and cover section 74 the remaining portion of such open top. The extension 20 provides an air space or chamber, indicated at 21, between tank 57 and the wall 18 of casing 14.

In the modified construction shown in Figures 6, 7 and 8, the outer casing and melting tank are indicated generally at 81, 82, respectively, and are constructed in a manner to receive air and splash-tight covers 83, 84 for the compartments 85, 86 respectively of the tank 82.

The sides 87 of tank 82 are formed below the angle bars 88 with longitudinally extending slots 89, 90 for passage of the covers 83, 84 respectively. The sides 91 of the casing 81 are provided with longitudinally extending slots 92, 93 which align with the slots 89, 90 respectively. The slots 92, 93 also are for the passage of the covers 83, 84 respectively and are arranged above the outlets 94. Each cover 83, 84 has its outer side formed with a handle member 95 to facilitate the positioning and removal thereof with respect to a compartment of tank 82.

Each cover is of the desired length and width to close a tank compartment for the purpose of preventing splashing of the molten material when the apparatus is moved from point to point. The covers also act when closed as means for smothering or extinguishing the flames from the molten material if the latter becomes ignited. The cover when in closed position provides substantially air-tight closures.

Secured to the sides of the casing 81 and tank 82 and extending through the slots 89, 90, 92 and 93 are channel-shaped guide members 96 arranged in pairs. The members of each pair are oppositely disposed, arranged in spaced relation and positioned at the ends of the pair of aligning slots. Each cover has associated therewith a pair of guide members.

The sides of the casing 81 have laterally extending hooks 97 for suspending the covers 83, 84 when not in use. The covers have openings 98 for the passage of hooks 97. The covers are of a width that when in closed position they will abut partition 67 of tank 82 and project a slight distance outwardly from the sides of casing 81.

In the form shown in Figures 6, 7 and 8, the standard 79 may be dispensed with, or positioned at the rear portion of a side of casing 81 so that a compartment cover will clear it. Otherwise than that as stated the form shown in Figures 6, 7 and 8 will be constructed in the same manner as that shown in the other figures of the drawings.

Although the preferred embodiment of the invention is as illustrated and described, yet it is to be understood that changes in the details of construction can be had which fall within the scope of the invention as claimed.

What I claim is:—

1. A mobile apparatus for melting and distributing bitumen, asphalt or tar comprising a supporting frame, a casing connected thereto, extending thereabove and providing a firebox, a melting tank removably suspended in said casing, said casing and tank having coacting means for closing the top of said firebox, heat generating means extending into said firebox below said tank, means within said tank at one end thereof for filtering the melted product, draw-off means extending through said tank end for the product, a pump communicating with said draw-off means, flexible distributing means for the filtered product extending from said pump, a partition within said tank to provide a pair of melting compartments, removable means within said firebox to provide in connection with said tank a pair of heating chambers, one for each melting compartment, removable closures for said compartments, and said filtering means secured to said end and to the bottom of the tank and to said partition, inclining downwardly from its top to its bottom from said tank end and coacting with the tank bottom and end and said partition to provide a pair of compartments to receive the filtered product.

2. In an apparatus for the purpose set forth, an open top casing having inwardly extending apertured flanges at its upper end, a portable supporting means for said casing, said casing providing a firebox, a melting tank having laterally projecting means seating on said flanges for suspending the tank in the firebox, said lateral means, tank and said flanges closing the top of the firebox, a partition in said tank to provide a pair of melting compartments, removable means mounted in said firebox and in connection with said tank providing a pair of heating chambers, one for each of said compartments, a pair of selectively controllable burner elements extending into the firebox, arranged in spaced relation and spaced from said tank, and removable closures for said compartments.

3. An apparatus for the purpose set forth comprising means providing a firebox having outlets at its top and controllable outlets in its sides, a melting tank depending within, spaced from and removably connected with the top of the firebox, a pair of spaced, apertured flues extending into the firebox from one end of the latter and beneath said tank, said flues closed at their inner ends, and selectively controllable burner elements extending into said flues from the outer ends of the latter.

4. An apparatus for the purpose set forth comprising means providing a firebox having outlets at its top and controllable outlets in its sides, a melting tank depending within, spaced from and removably connected with the top of the firebox, a pair of spaced, apertured flues extending into the firebox from one end of the latter, said flues closed at their inner ends, selectively controllable burner elements extending into said flues from the outer ends of the latter, means within said tank to provide a pair of melting compartments, removable means extending into the firebox to provide a pair of heating chambers, one for each compartment, said removable means positioned between said flues and spaced therefrom, and removable closures for said compartments.

5. An apparatus for the purpose set forth comprising means providing a firebox having outlets at its top and controllable outlets in its sides, a melting tank depending within, spaced from and removably connected with the top of the firebox, a pair of spaced apertured flues extending into the firebox from one end of the latter and beneath said tank, said flues closed at their inner ends, selectively controllable burner elements extending into said flues from the outer ends of the latter, the apertures in said flues opening toward said tank.

6. In an apparatus for the purpose set forth, a melting tank including a front end, a rear end and a bottom and provided with a vertically disposed partition lengthwise thereof and secured to said ends to form a pair of melting compartments, means connected to the sides of the said partition and to the inner face of the rear end and the upper face of the bottom of said tank to provide a filter for the melted product and in connection with said partition and tank providing a pair of compartments at the rear of the tank for the filtered product, said means being of less height than the said partition and the said rear end, a draw-off means for each of said second mentioned compartments for the filtered product, and removable closures for said melting compartments.

7. In an apparatus for the purpose set forth, a melting tank including a front end, a rear end and a bottom and provided with a vertically disposed partition lengthwise thereof and secured to said ends to form a pair of melting compartments, means connected to the sides of the said partition and to the inner face of the rear end and the upper face of the bottom of said tank to provide a filter for the melted product, said screen in connection with said partition and tank providing a pair of compartments at the rear of the tank for the filtered product, said means being of less height than the said partition and the said rear end, and a draw-off means extending through said rear end for each of said compartments for the filtered product, a pump common to said draw-off means, and flexible distributing means leading from said pump.

8. In an apparatus for the purpose set forth, a casing providing a firebox, a melting tank removably suspended within the latter from the top of said casing, spaced heating flues extending into said firebox and having the body portions thereof apertured and their inner ends closed, the apertures in said flues opening in a direction toward said tank, said flues spaced from said tank, burner elements supported from one end of said casing and extending into said flues, a liquid fuel supply tank arranged at one end of said casing, supply lines leading from said fuel tank to said burners, and means for protecting said fuel supply tank from the heat from the firebox and the flames from the burners, said means being connected to that end of the casing supporting said elements and having a part thereof supporting said supply tank.

9. An apparatus for the purpose set forth comprising a casing formed with inwardly extending, apertured flanges at the top thereof and providing a firebox, the apertures in said flanges providing permanently opened outlets for said firebox, heating means opening into said firebox, an open top melting tank disposed in said firebox and suspended from said flanges, a cover element formed of two sections hinged together, one of said sections closing one portion of the top of the tank inwardly of certain of the apertures in said flanges, the other section closing the other portion of the tank and seating on the rear portions of the sides of the casing outwardly with respect to the remaining apertures of said flanges, and removable closures for said compartments, said closures supported by said casing and tank below said outlets.

10. An apparatus for the purpose set forth comprising a casing formed with inwardly extending, apertured flanges at the top thereof and providing a firebox, the apertures in said flanges providing permanently opened outlets for said firebox, heating means opening into said firebox, an open top melting tank disposed in said firebox and suspended from said flanges, a cover element formed of two sections hinged together, one of said sections closing one portion of the top of the tank inwardly of certain of the apertures in said flanges, the other section closing the other portion of the tank and seating on the rear portions of the sides of the casing outwardly with respect to the remaining apertures of said flanges.

11. In an apparatus for the purpose set forth, a melting tank provided with a partition to form a pair of melting compartments, a screen connected to the sides of said partition and to the inner face of one end and of the bottom of the tank to provide a filter for the melted product and in connection with said partition, end and bottom walls providing a pair of compartments within and at one end of the tank for receiving the filtered product, and a drain off means extending through said end for the filtered products from said second mentioned compartments.

12. In a mobile melting and distributing apparatus for bitumen, asphalt or tar, a melting tank provided with a vertically disposed lengthwise extending partition forming the tank into a pair of compartments, supporting means secured to the inner face of the outer side wall of each compartment for a container carrying material to be melted to enable the preliminary heating of such material, said partition having the rear portion of its top edge cut away to provide a clearance for said container, and a two part hinged cover for said tank, one of said parts closing the forward portion of the top of the tank and the other part arranged over the rear portion of the top of the tank, said part arranged over the rear portion of the tank being of materially greater height than said other part for enclosing said container and providing a heating chamber for the latter.

13. In an apparatus for the purpose set forth, a casing providing a fire box, a melting tank suspended therein, said tank and casing having coacting means providing a closure for the top of the fire box, said means having permanently opened outlets for the fire box, a pair of spaced flues below the tank disposed lengthwise of the casing, having the inner ends thereof closed, the tops thereof apertured, their outer ends open and supported from the front end of the tank, and a burner element extending into the outer end of each flue.

14. In an apparatus for the purpose set forth, a casing providing a fire box, a melting tank suspended therein, said tank and casing having coacting means providing a closure for the top of the fire box, said means having permanently opened outlets for the fire box, a pair of spaced flues below the tank disposed lengthwise of the casing, having the inner ends thereof closed, the tops thereof apertured, their outer ends open and supported from the front end of the tank, a burner element extending into the outer end of each flue, supporting means for the casing, a container for a liquid fuel supply carried by said casing, and fuel conducting means leading from said container to said elements.

15. In an apparatus for the purpose set forth, a casing providing a fire box, a melting tank suspended therein, said tank and casing having coacting means providing a closure for the top of the fire box, said means having permanently opened outlets for the fire box, a pair of spaced flues below the tank disposed lengthwise of the casing, having the inner ends thereof closed, the tops thereof apertured, their outer ends open and supported from the front end of the tank, a burner element extending into the outer end of each flue, supporting means for the casing, a container for a liquid fuel supply carried by said casing, fuel conducting means leading from said container to said elements, and means for protecting said container from the heat from the fire box and from the flames from said elements.

16. In an apparatus for the purpose set forth an open top casing having inwardly extending flanges at the upper end of its sides, front and rear walls, said flanges having spaced outlet openings, said casing providing a fire box, a melting tank of semi-cylindrical cross section having its sides, front and rear walls below the upper ends thereof provided with outwardly directed flanges seating on the flanges of the casing for suspending the tank within the fire box, the free edges of the flanges of the tank having notches registering with said openings.

17. In an apparatus for the purpose set forth an open top casing having inwardly extending flanges at the upper end of its sides, front and rear walls, said flanges having spaced outlet openings, said casing providing a fire box, a melting tank of semi-cylindrical cross section having its sides, front and rear walls below the upper ends thereof provided with outwardly directed flanges seating on the flanges of the casing for suspending the tank within the fire box, the free edges of the flanges of the tank having notches registering with said openings, an upstanding partition within and extending from the front to the rear of the tank and providing a pair of melting compartments, means within the tank and secured to the rear and bottom of the tank and to the partition, said means providing a filter for the melted product and in connection with said bottom, rear and partition forming a pair of compartments for the filtered product, and means for selectively and simultaneously drawing off the filtered product from the compartments containing the latter.

18. In an apparatus for the purpose set forth an open top casing having inwardly extending flanges at the upper end of its sides, front and rear walls, said flanges having spaced outlet openings, said casing providing a fire box, a melting tank of semi-cylindrical cross section having its sides, front and rear walls below the upper ends thereof provided with outwardly directed flanges seating on the flanges of the casing for suspending the tank within the fire box, the free edges of the flanges of the tank having notches registering with said openings, an upstanding partition within said tank to provide a pair of melting compartments, and means extending through the rear of the tank and fire box and opening into said compartments for selectively and simultaneously drawing off the melted product from said compartments.

19. In an apparatus for the purpose set forth an open top casing having inwardly extending flanges at the upper end of its sides, front and rear walls, said flanges having spaced outlet openings, said casing providing a fire box, a melting tank of semi-cylindrical cross section having its sides, front and rear walls below the upper ends thereof provided with outwardly directed flanges seating on the flanges of the casing for suspending the tank within the fire box, the free edges of the flanges of the tank having notches registering with said openings, an upstanding partition within said tank to provide a pair of melting compartments, means extending through the rear of the tank and fire box and opening into said compartments for selectively and simultaneously drawing off the melted product from said compartments, and removable closures for said compartments extending through the sides of the fire box, abutting said partition and arranged below said outlets.

In testimony whereof, I affix my signature hereto.

FRED M. HARGRAVE.